C. HEIDENHEIMER.
COMBINATION SLED AND WAGON.
APPLICATION FILED JUNE 11, 1910.
984,914.
Patented Feb. 21, 1911.
2 SHEETS—SHEET 1.
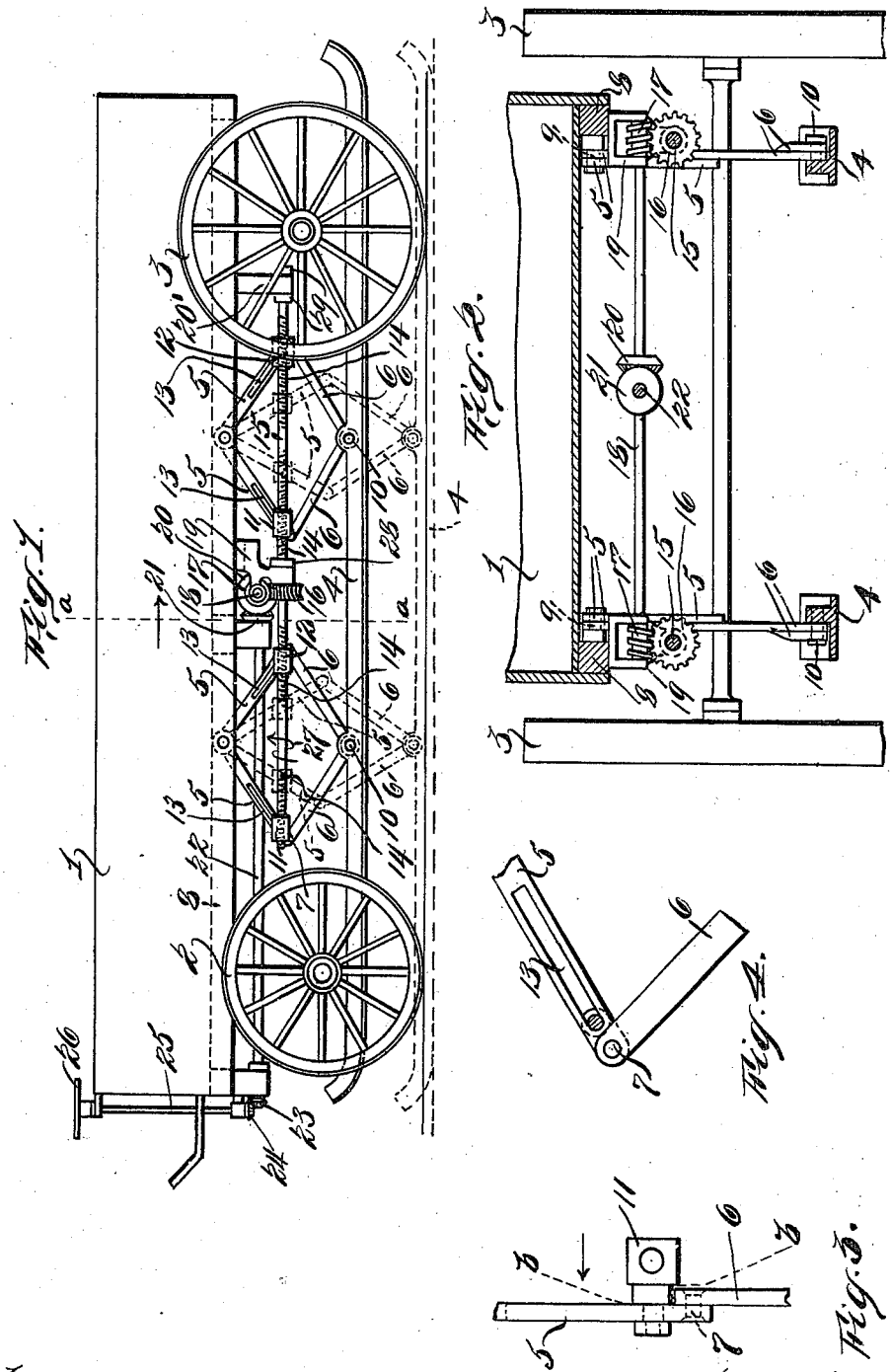

C. HEIDENHEIMER.
COMBINATION SLED AND WAGON.
APPLICATION FILED JUNE 11, 1910.
984,914.
Patented Feb. 21, 1911.
2 SHEETS—SHEET 2.
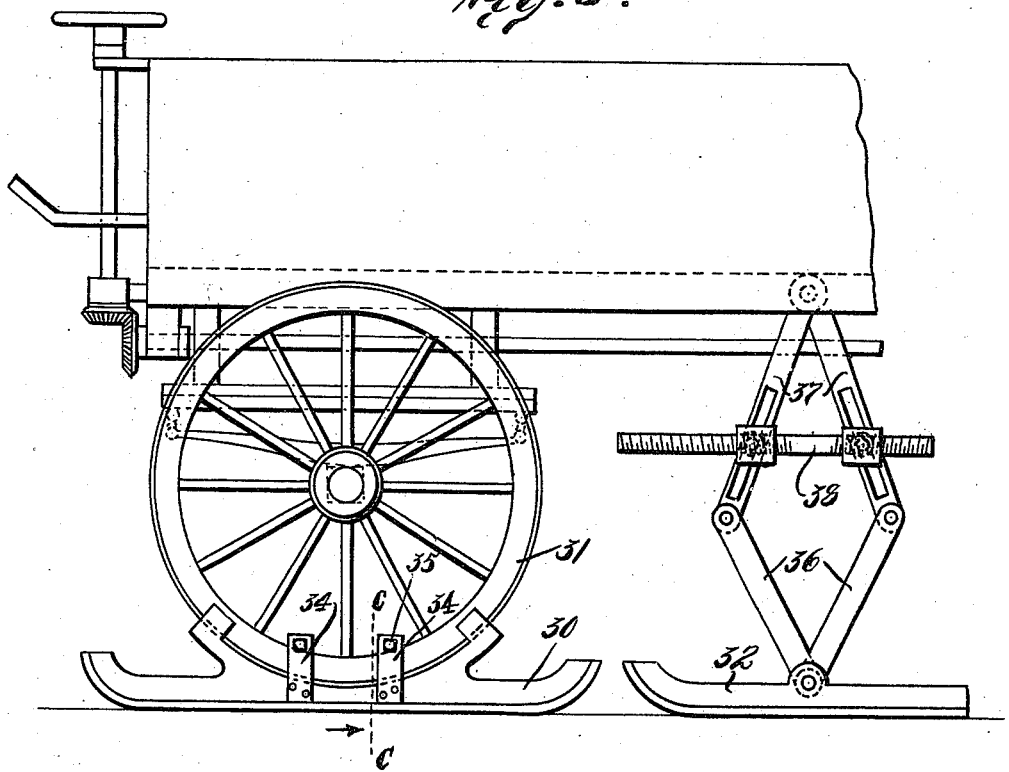
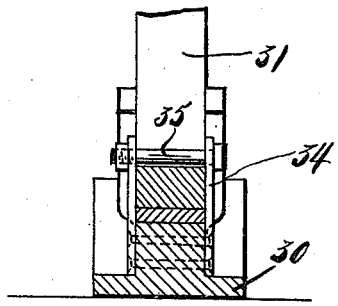
Witnesses
E. A. Jarvis
Estelle O. Hamburger.
Inventor:
Charles Heidenheimer.
by Maurice Block
attorney.

UNITED STATES PATENT OFFICE.

CHARLES HEIDENHEIMER, OF NEW YORK, N. Y.

COMBINATION SLED AND WAGON.

984,914. Specification of Letters Patent. Patented Feb. 21, 1911.

Application filed June 11, 1910. Serial No. 566,367.

*To all whom it may concern:*

Be it known that I, CHARLES HEIDENHEIMER, a subject of the Emperor of Germany, residing in the borough of Manhattan, city, county, and State of New York, have invented certain new and useful Improvements in Combination Sleds and Wagons, of which the following is a clear, full, and exact description.

This invention relates to a combined wagon and sled, the object being to provide a vehicle that is adapted for use upon snow, ice or the bare ground, that is to say, a device normally constituting a vehicle having wheels, but also provided with runners that are normally held in suspension, upon the body of the wagon, free from the ground, during such times that ice or snow are not present. Special means are provided, in my improved vehicle, for lowering or raising the runners at will.

I will now proceed to describe my invention in detail, the novel features of which I will finally claim, reference being had to the accompanying drawings forming part hereof, wherein:

Figure 1 is a side elevation of my improved vehicle; Fig. 2 is a vertical sectional view thereof taken on a line *a—a* in Fig. 1, the upper part of the body being removed; Fig. 3 in an enlarged detail end view showing the toggle connection which forms part of my improvement; Fig. 4 is a sectional side elevation thereof, the section being taken on a line *b—b* in Fig. 3; Fig. 5 is a side elevation of a portion of my improved vehicle embodying another form of runners; and Fig. 6 is an enlarged detail sectional view taken on a line *c—c* in Fig. 5.

Referring to Fig. 1, of the drawings, the body of my improved vehicle is indicated by 1, the said body being provided with front wheels 2 and rear wheels 3, one of each only being shown.

It is, of course, well known that the front wheels of a wagon are carried by an axle secured to a fifth wheel; for this reason the fifth wheel has not been shown, the springs and other well known adjuncts being also omitted. As illustrated in Fig. 1, the vehicle is adapted for use as a wagon.

Under the body 1 of the wagon, I suspend runners 4 (see also Fig. 2), the said runners being held in suspension by means of toggle-joints consisting of arms 5 and 6 pivotally connected, as at 7, to each other (see Figs. 3 and 4). The arms 5 are also pivotally connected to the frame members 8 of the body 1, as at 9, the arms 6 being pivotally connected to the runners 4 as at 10. The arms 5 and 6 form a toggle connection which, when the pivotal points 7 are caused to approach each other, force the runners 4 downwardly until they touch the ground, or snow or ice on the ground. When the pivotal points 7 are caused to move away from each other the runners 4 will rise from the ground.

To operate the arms, as above described, I mount upon one pair of arms 5 a threaded block 11, and upon the other pair a block 12, the said blocks being provided with a stud adapted to pass through and slide in a slot 13 in said arms. Each threaded block 12 and 11 is adapted to receive the threaded portion 14 of a rotatable shaft 15, which carries a worm gear 16, having in mesh therewith a worm 17 carried by a rotatable transverse shaft 18 (see Fig. 2). The shaft 18 is rotatably supported by brackets 19 on the frame members 8.

To rotate the shaft 18 to operate the threaded shaft 15, I mount upon the said shaft 18, a gear 20 having in mesh therewith a similar gear 21. The gear 21 is carried by a longitudinal shaft 22 mounted on the body 1, as shown. The outer end of the shaft 22 is provided with a gear 23, having in mesh therewith a similar gear 24 carried by a vertical shaft 25, provided with an operating wheel 26.

By referring to Fig. 1, it will be seen that a portion of the shafts 15, one only being seen in this view, is threaded right handed, while the other portions are threaded left handed, the corresponding blocks 11 and 12 being likewise threaded.

It will be apparent from an inspection of the drawings that when the shaft 25 is rotated the shafts 15 will be also rotated and will draw the blocks 11 and 12 together, thereby causing the runners 4 to lower, that is provided the runners are up and the shafts 15 are rotated as per the arrow 27. The shafts 15 are held against longitudinal movement by the worm gear 16, and collar 28, one only being shown, as well as by the bracket 20' and collars 29.

Should I desire to use the runners 4, I lower the said runners in a manner above described, until they strike the ground, snow or ice. After the runners have come in contact with the ground, snow or ice, a continued movement of the shafts 15 will raise the body 1, and wheels thereupon clear of the ground, thereby rendering the wheels inoperative for the purpose of supporting the body 1. The vehicle will now be adapted for the purposes of a sled. The dotted line position of the runners 4 in Fig. 1, illustrate the device converted into a sled. The shafts 15 also act as braces for the runners, when said runners support the body, by taking the thrust of the strain imposed upon the vehicle by the pull or push of the power applied thereto. A reverse movement of the shafts 15 will raise the runners and allow the wheels to contact with the ground. As shown in Fig. 1 the runners 4 are rigid throughout the length of the vehicle.

In the modified form of vehicle illustrated in Figs. 5 and 6, a portion of the vehicle only being shown, I provide independent runners 30 for the front wheels 31, which are adapted to turn, the object being to provide a vehicle of this character, having forward runners which will turn with the front or steering portion of the vehicle. The runners 30 are adapted for attachment to the wheels, when the wheels are raised from the ground by lowering the main runners 32, which are operated in the manner described for the runners 4. The runners 30 are provided with clamps, which are adapted to secure the said runners to the felly of the wheels, the said clamps consisting of plates 34, one on each side of the rim of the wheel, and a clamp screw 35, which will bind the plates 34 to the said fellies.

The runners 32 are operated by a toggle joint consisting of the arms 36 and 37, the said arms being actuated by the threaded shaft 38. The operation of the said shaft 38 is accomplished in the same manner as the shafts 15. It will, of course, be understood that both sides of the vehicle will be provided with runners 32 and operating mechanism therefor, there being also an independent runner 30 for each of the front wheels. When not in use, the runners 30 may be stored in any convenient place.

Having now described my invention, what I claim and desire to secure by Letters Patent is:—

1. A combined wagon and sled, consisting of a body, wheels carried thereby, runners carried by said body adapted for vertical movement, toggle joints connecting said body and said runners, threaded blocks carried by said joints, a threaded shaft adapted to engage said blocks, and means adapted to actuate said shaft.

2. A combined wagon and sled, consisting of a body, wheels carried thereby, runners carried by said body adapted for vertical movement, toggle joints connecting said body and said runners, threaded blocks carried by said joints, a threaded shaft adapted to engage said blocks, a worm gear carried by said shaft, a worm in engagement therewith, and means adapted to actuate said worm.

3. A combined wagon and sled, consisting of a body, wheels carried thereby, runners carried by said body adapted for vertical movement, toggle joints connecting said body and said runners, threaded blocks carried by said joints, a threaded shaft adapted to engage said blocks, a worm gear carried by said shaft, a worm in engagement therewith, a rotatable shaft carried by said body at the front end thereof, and means connecting said shaft and said worm adapted to actuate said worm.

Signed at New York city, N. Y., on this 9th day of June, 1910.

CHARLES HEIDENHEIMER.

Witnesses:
EDWARD A. JARVIS,
JOS. HEIDENHEIMER.